June 6, 1944. M. AHNERT 2,350,710
GRINDING MACHINE
Filed Dec. 12, 1941 5 Sheets-Sheet 2
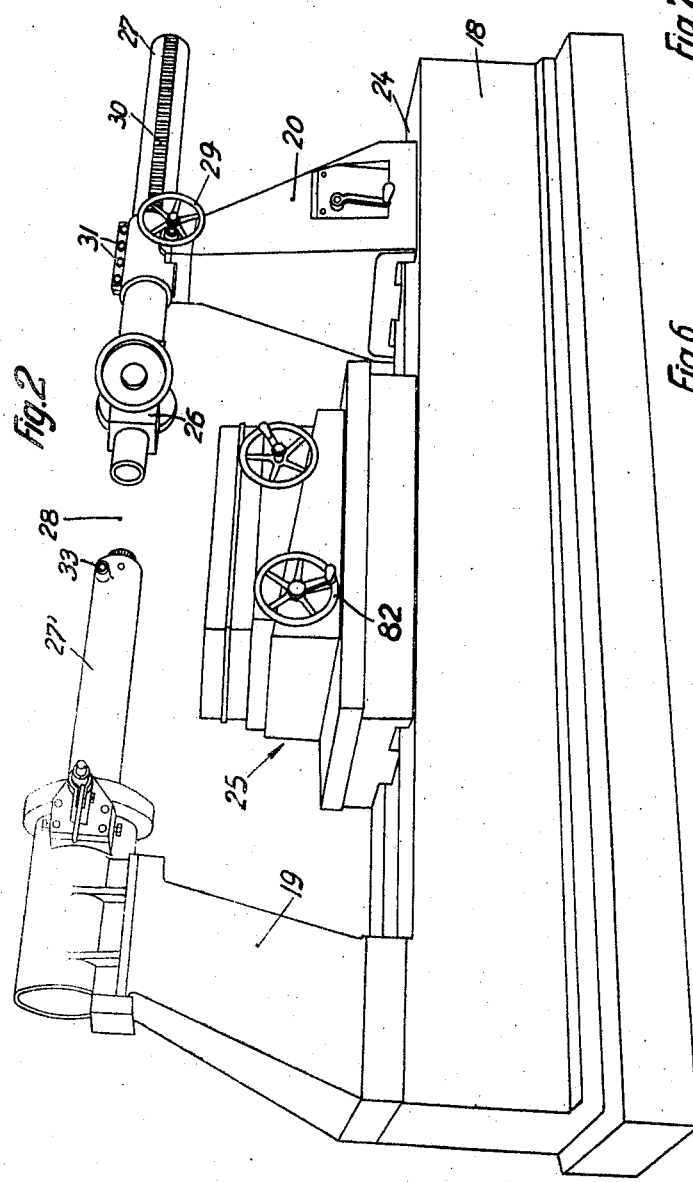
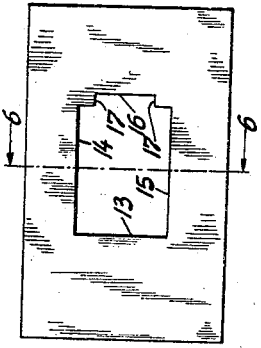
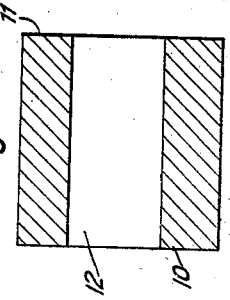
Inventor
MAX AHNERT
By
Attorney

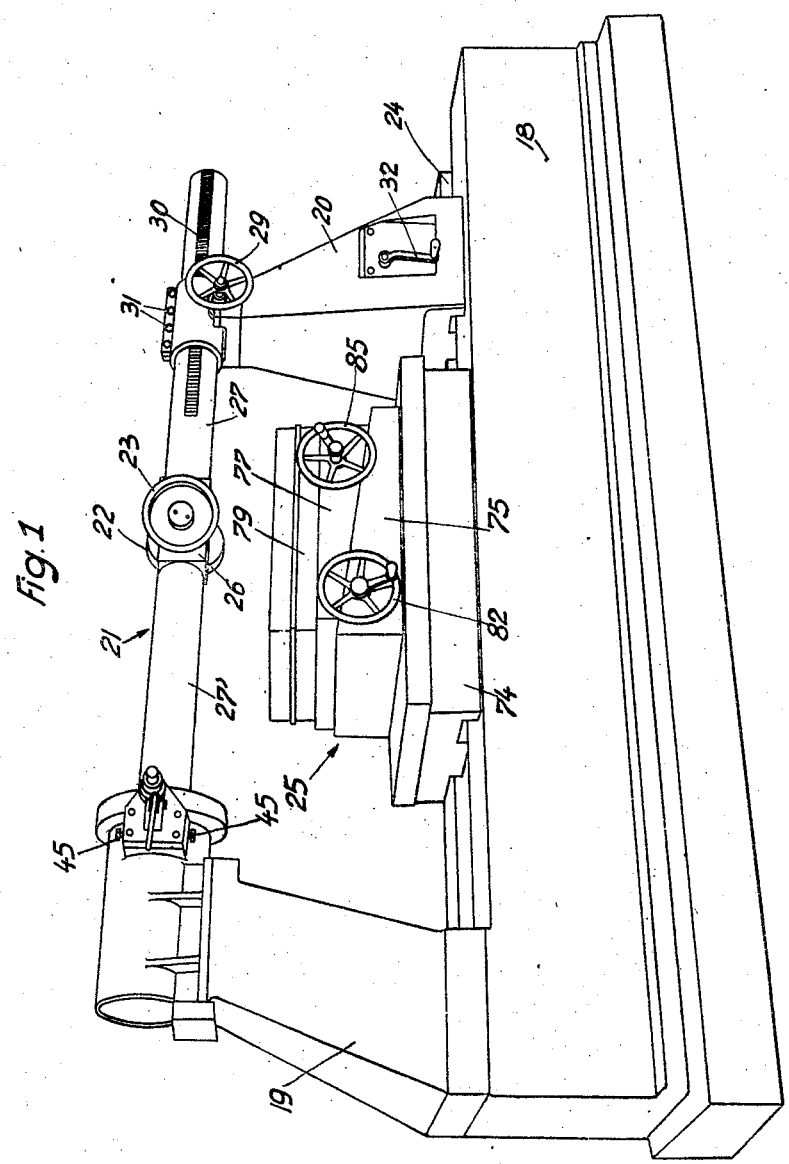

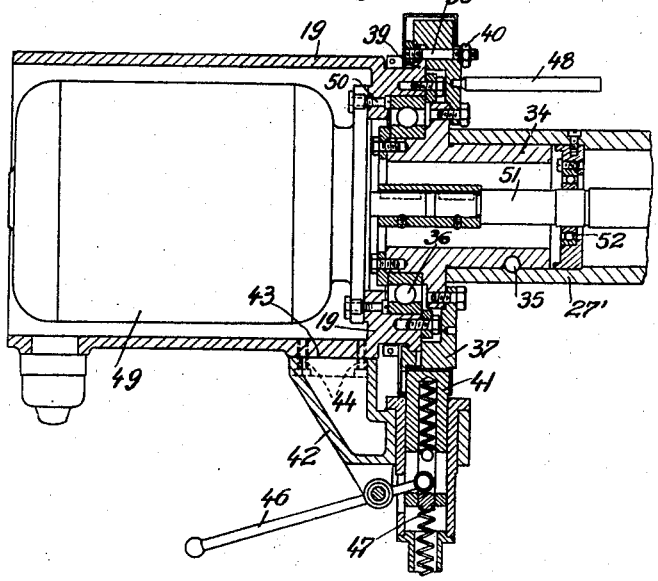
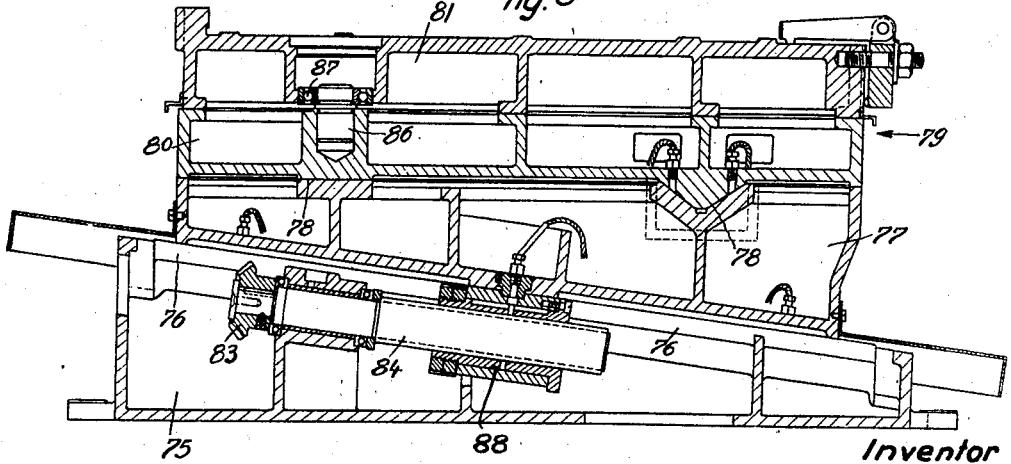

June 6, 1944.  M. AHNERT  2,350,710
GRINDING MACHINE
Filed Dec. 12, 1941  5 Sheets-Sheet 4

Inventor
MAX AHNERT
By
Attorney

June 6, 1944.  M. AHNERT  2,350,710
GRINDING MACHINE
Filed Dec. 12, 1941   5 Sheets-Sheet 5

Inventor
MAX AHNERT
By
Attorney

Patented June 6, 1944

2,350,710

UNITED STATES PATENT OFFICE 2,350,710

GRINDING MACHINE

Max Ahnert, Aschersleben, Germany; vested in the Alien Property Custodian

Application December 12, 1941, Serial No. 422,615
In Germany June 8, 1940

13 Claims. (Cl. 51—122)

The object of my invention is a grinding machine adapted to accurately finish the internal walls of a prismatic passage-way extending through a work piece and having a polygonal, more particularly a rectangular, cross-section. A more specific object is to provide a machine of this kind which is simple in design and operation and combines rigidity with great accuracy.

A further object is to provide a machine of this type in which the guides for producing the relative motion of the tool and the work piece shall have comparatively large guiding surfaces which are so disposed that they can be efficiently protected from chips and dust. A further object is to increase the working range of the machine so as to render it capable of working on work pieces of a great variety of different dimensions.

I attain these and other objects by mounting one or more grinding discs on a beam extending through the passage-way of the work piece and by journalling the beam at both of its ends in spaced standards of a frame provided with a guideway extending parallel to the beam and accommodating a slide carrying the work piece. Although narrow limits are set to the diameter of the beam by the cross-section of the passage-way, the rigid mounting of both ends of the beam in the standards of the frame will reduce deflections of the beam to a minimum, even if the size of the work piece should require a comparatively large distance of the standards and a small diameter of the beam. I produce the relative motion between the work piece and the grinding wheels by adjustably but rigidly mounting the grinding spindle on the beam and by imparting the feed motion to the work piece only. To this end, I preferably provide a transverse guide carrying a slidable work support on the reciprocatory slide so that the work support may be adjusted transversely to its reciprocatory motion and I interpose a member having a slanting top between the guide and the reciprocatory slide for lifting or lowering the work piece.

As both ends of the beam are firmly clamped to the standards, special provisions are required to enable the beam to be passed through the passage-way of the work piece or, in other words, to slip the work piece upon the beam. To this end, the removal of one of the standards could be taken in consideration, as upon such removal one end of the beam would be exposed so that the work piece could be slipped thereupon.

However, I have found a far superior solution of this problem which resides in a composition of the beam of separable sections. I need only separate one section of the beam and shift the same in the standard to space it from the other section whereupon the work piece may be slipped on one of the two sections. Then the sections are united again.

Further objects of my invention will appear from the description of a preferred embodiment thereof and the features of novelty will be pointed out in the claims.

In the drawings

Fig. 1 is a perspective illustration of the machine, the work piece being omitted;

Fig. 2 is a similar representation of the machine, the sections of the beam being separated for removal of the finished work piece and for attachment of a new work piece;

Fig. 3 is a horizontal transverse section taken through the standard shown at the left of Figs. 1 and 2 and through the section of the beam mounted therein;

Fig. 6 is a section through a work piece taken along line 6—6 of Fig. 7;

Fig. 7 is an end-view of a work piece, and

Fig. 8 is a vertical longitudinal section taken through the work support.

Figure 4:
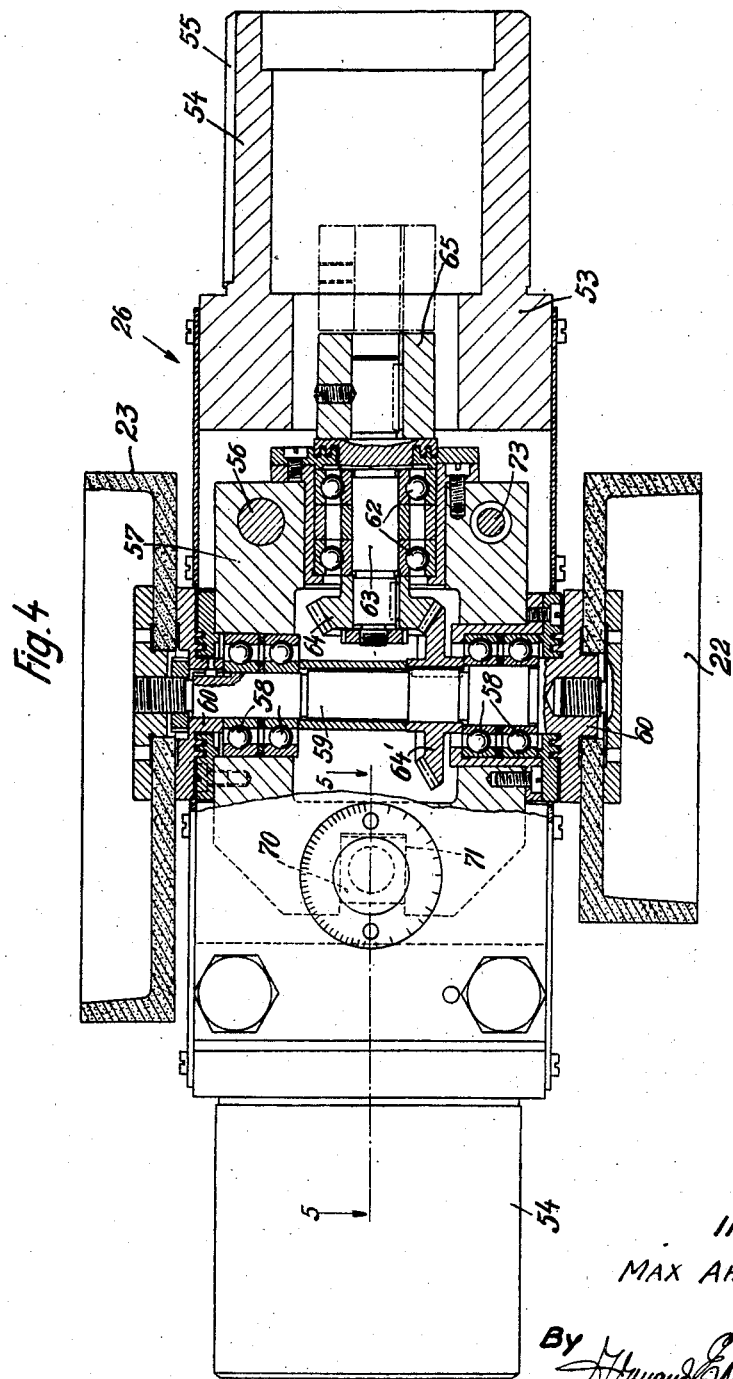
Fig. 4 is a plan-view of the grinding head, partly in section taken along line 4—4 of Fig. 5.

In Figs. 6 and 7 I have illustrated a typical work piece for the operation on which I have invented the machine. The work piece is provided with a passage-way 12 extending from the front 10 to the opposite back 11 and having the polygonal cross-section which will appear from Fig. 7. The internal surfaces 13, 14, 15 and 16 are to be finished by the grinding machine to be described hereinafter. The face 16 is provided with two shoulders 17. The faces 13 and 16 are parallel to one another. The same applies to the faces 14 and 15.

A grinding machine which meets these requirements is shown in Fig. 1 in a more or less diagrammatic fashion. It comprises a bed or frame 18 on which two standards 19 and 20 are provided. A horizontal beam 21 extending above and parallel to the bed 18 has both of its ends firmly clamped within aligned bearings provided within the standards. The beam carries two grinding discs 22 and 23 having their common spindle extending transversely to the beam.

Either the entire beam or at least a section thereof carrying the grinding wheels is angularly adjustable about its longitudinal axis, whereby the grinding spindle may be brought either to a horizontal position as shown in Fig. 2 for work on the faces 13 and 16 of the work piece or may be brought into a vertical position for work on the faces 14 and 15 of the work piece.

The bed 18 is provided with a guide-way 24 extending below the beam 21 parallel thereto. On this guide-way a reciprocatory slide 74 is mounted. This slide carries work-supporting means, designated as a hole by 25, which serve for adjusting the work piece relative to the slide vertically, transversely and angularly as will be described later on.

In order to enable the beam 21 to be passed through the work piece mounted on the work support 25, the beam is composed of separable sections. These sections comprise a grinding head 26 carrying the grinding discs and two coaxial tubes 27 and 27' extending from the opposite ends of the head 26. Upon detachment of the tube 27' from the head 26, the tube 27 and the grinding head attached thereto can be shifted within the standard 20 to the position shown in Fig. 2 so that a gap 28 will be formed through which the work piece may be passed upon the section 27' of the beam before it is definitely attached to the work support and adjusted in position. After the work piece has been introduced into the machine in this manner, the sections 27 and 27' are firmly clamped together again.

For shifting the section 27 of the beam within its bearing provided in the standard 20, suitable driving means are mounted on the standard, which in the present embodiment comprise a pinion (not shown) connected with a hand-wheel 29 and journalled within the standard 20. This pinion engages rack-teeth 30 of the tube 27. The bearing constituted by the upper end of the standard 20 and accommodating the tube 27 is split lengthwise and may be firmly clamped upon the tube by suitable clamping means which in the present embodiment are constituted by bolts 31. In this manner, the section 27 of the beam may be firmly clamped in position after the work piece has been inserted and after the beam-sections have been re-attached to each other.

The spacing of the standards 19 and 20 depends on the length of the stroke of the reciprocatory work-support 25 on the frame 18, and this stroke is determined by the dimensions of the work piece. It is desirable, however, to reduce the distance of the standards to a minimum in order to enhance the rigidity of the mounting of the grinding wheels and to increase the consequent accuracy of operation. Therefore, I prefer to render the spacing of the standards variable so as to suit the conditions of any particular work. This object is achieved by slidably and adjustably mounting at least one of the two standards on the guide-way 24 of the bed. Preferably, suitable driving means are provided for displacing the standard on the guide-way 24 and for clamping it thereto in adjusted position. The clamping means include a hand-crank 32 shown in Figs. 1 and 2.

After the work piece has been slipped over the section 27' of the beam and has been attached to the work-support, the beam section 27 with the grinding-head 26 is moved towards the left again by operation of the hand-wheel 29, whereupon the grinding head is firmly attached to the tube 27' by operation of a clamping bolt 33. After the machine has been set up in this manner, the slide 74 is reciprocated on the guide-way 24, preferably by hydraulic means which are wellknown in the art. In the course of the reciprocation of the work piece the internal faces thereof are operated upon and are finished by the grinding wheels. The work piece is intermittently adjusted so that the grinding wheel in operation will remove the required amount of stock.

In Fig. 2, the grinding discs assume the position required for work on the internal faces 13 and 16 of the work piece. In order to finish the internal faces 14 and 15, the operator first loosens suitable clamping bolts (not shown) which clamp the inner end of the tube 27 to the grinding head 26 and then loosens the beam section 27' from the standard 19 by releasing nuts 40 to be described later on (Fig. 3), whereupon he turns the beam-section 27' and the grinding head 26 about the longitudinal axis by 90 degrees. The beam-sections are then firmly secured in the new position again in which the axis of the grinding wheels is disposed vertically. In order to accurately determine the angular position of the beam-section 27', it is provided with an indexing mechanism, the details of which are shown in Fig. 3.

The outer end of the tubular beam-section 27' is engaged by a sleeve 34 which is secured against angular or longitudinal displacement in the tube by a pin 35 and carries the inner race of a ball-bearing 36, the outer race of which is mounted in a horizontal bore of the standard 19. The sleeve 34 has a flange to which an index disc 37 is attached by screws. The index disc carries a plurality of clamping bolts 38 having the nuts 40 mentioned hereinabove. When these nuts are tightened, heads on the bolts 38 engage behind a flange 39 projecting from the standard 19 to firmly clamp the index disc and the beam-section 27' together. In order to angularly adjust the beam-section, the nuts 40 are first loosened.

The periphery of the index disc 37 is provided with a plurality of recesses and one of these recesses is engaged by an index dog formed by a pin 41 slidably mounted in a bracket 42 in radial direction. This bracket is rigidly but adjustably attached to the standard 19. To this end, the standard is provided with a vertical guide-way 43 on which the bracket 42 is vertically adjustable and is clamped in adjusted position by bolts 44. The vertical adjustment of the bracket 42 may be effected with great accuracy by stop-screws 45 (Fig. 1), which are seated in tapped bores of suitable projections of the standard 19 and engage the bracket 42. By loosening the clamping bolts 44 and by adjusting the screws 45, the bracket 42 may be lifted or lowered and, thereby, the angular position of the beam-section 27 may be determined very accurately. Should the operator, upon commencement of the grinding operation, find that the grinding disc cuts on one side only of the internal face to be finished, he must re-adjust the beam by means of the screws 45 until the grinding disc will cut over the entire width of the internal face.

The spacing of the recesses provided in the periphery of the index disc 37 amounts to an angle which is equal to the angle formed by the internal faces of the work piece. In the present instance, this angle amounts to 90 degrees. A lever 46 pivotally mounted in the bracket 42 engages a recess of the dog 41 and serves the purpose to disengage the same contrary to the action of a helical spring 47, if it is desired to adjust the beam. The angular adjustment is accomplished by means of a suitable wrench 48 to be inserted in an opening of the index disc after the nuts 40 have been loosened and the dog 41 has been released.

The driving motor 49 of the grinding discs is accommodated in the hollow upper end of the standard 19 and is attached thereto by screws 50. This electric motor drives a shaft 51 which is mounted coaxially within the tubular beam-section 27' in antifriction bearings 52 and extends to the grinding head 26 to drive the grinding discs.

Figure 5:
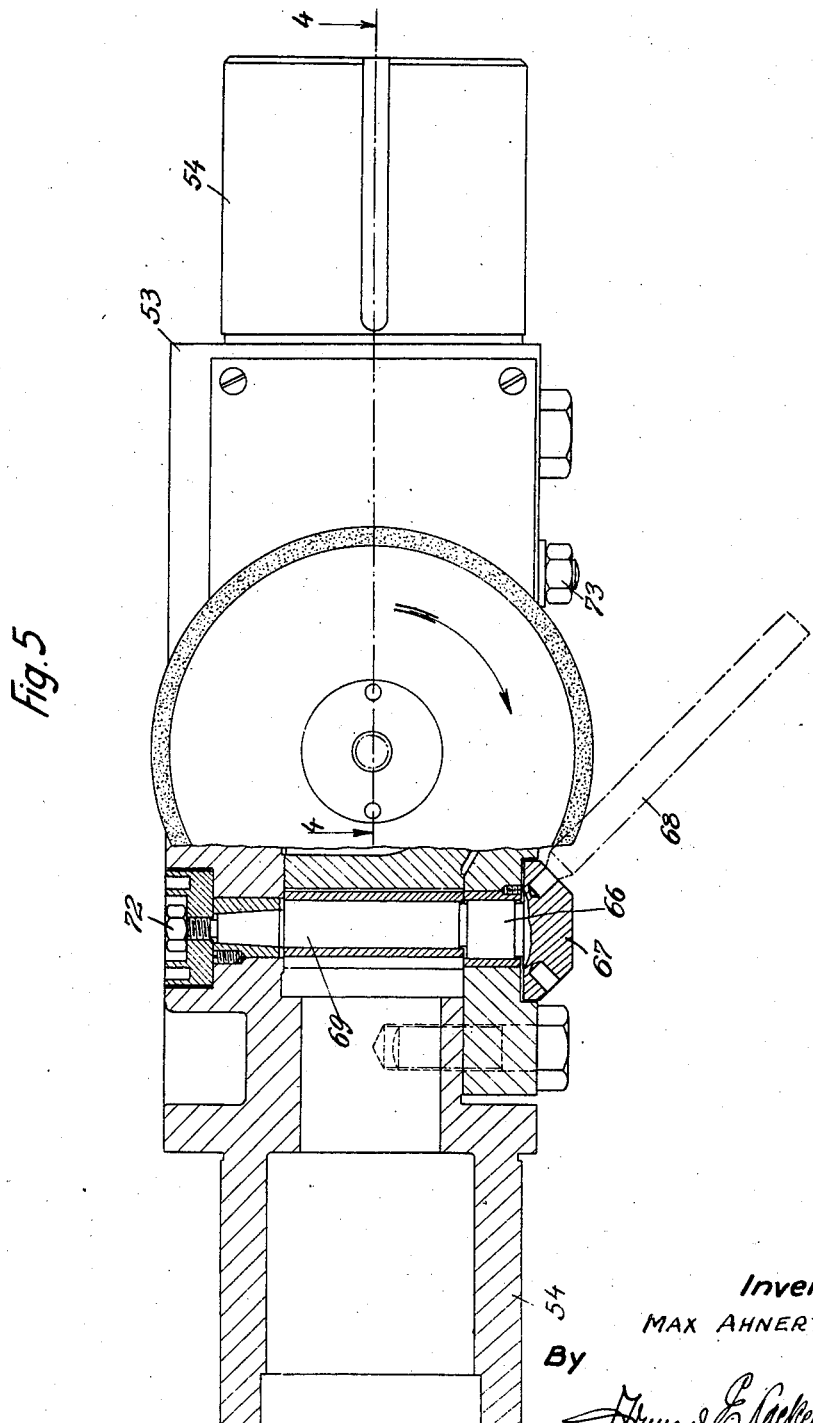
Fig. 5 is an elevation of the grinding head, partly in section taken along the line 5—5 of Fig. 4.

The grinding head is shown in Figs. 4 and 5. It comprises a casing 53 of rectangular cross-section provided with two opposite coaxial cylindrical projections 54 engaging into the tubes 27 and 27'. The tubular section 27' is secured against angular displacement on the coordinated projection 54 by a suitable key engaging a notch 55 (Fig. 4), whereas the other projection 54 is rotatable within the tubular section 27. The ends of both tubular sections engaging over the projections 54 are longitudinally split and are provided with clamping screws such as 33, shown in Fig. 2. These clamping screws are tightened after the work piece has been inserted in the machine and after the grinding spindle has been accurately adjusted. By the clamping screws 33 the three sections 27, 26 and 27' of the beam are firmly united. Through the casing 26, there extends a shaft 56 which is fixed in the walls of the casing and carries a pivotal holder 57 in which aligned ball-bearings 58 are suitably attached. In these bearings, the shaft or spindle 59 of the grinding discs is journalled which extends transversely to the shaft 56 and to the beam. The ends of this spindle project through suitable openings of the casing 53 and carry bushings 60 on which the grinding discs 22 and 23 are clamped. The openings in the casing 26 are sealed by suitable means.

In the present instance, the grinding discs are cup-shaped working on the work piece with their rims. Moreover, the holder 57 has a ball-bearing in which the shaft 63 of a bevel pinion 64 is journalled which is in mesh with a bevel-gear 64' attached to the grinding spindle 59. The shaft 63 is connected with the drive-shaft 51 by a suitable clutch, part of which is shown at 65.

The holder 57 is pivotally adjustable on the shaft 56. By such angular adjustment of the holder, the grinding disc which is in operation at any time may be set, as desired, to either engage the face to be finished with its entire periphery or with part of its periphery only. In the first instance, the grinding marks produced on the work piece will cross each other, whereas, in the second instance, the grinding marks are in the form of parallel arcs extending across the finished face. The accurate adjustment may be effected by means of a shaft 66 which is journalled in the casing 53 and has a head 67 provided with bores in which a wrench 68 may be inserted for turning the shaft. The shaft has an eccentric section 69 carrying a block 70 which slidably engages parallel walls of a recess 71 provided in the holder 57. After the holder has been adjusted by suitably turning the shaft 66, the latter is clamped in position by tightening a nut 72 mounted on the threaded end of the shaft and engaging a suitable insert of the casing 53. In adjusted position, the holder 57 is firmly clamped in position within the casing 53 by means of a clamping screw 73. The clutch 65 is of the type permitting a slight misalignment of the shaft 63 and of the drive-shaft 51, such as is caused by a slight angular displacement of the holder 57 about the shaft 56.

The work-support 25 is illustrated in Fig. 8. It comprises a member 75 which is attached on the slide 74 and is provided with a slanting top 76 on which a guide member 77 is adjustably mounted. The guide 77 is provided at its top with a horizontal guide-way 78 extending transversely to the guide-way 24 of the bed 18. On this transverse guide 77 a work-support 79 is slidably and adjustably mounted which is composed of two sections. These two sections 80 and 81 are relatively pivotal and adjustable about a vertical axis.

In the member 75 there is journalled a horizontal shaft extending transversely to the guide-way 24 of the bed 18. This shaft is not shown in Fig. 8, but its position will appear from Fig. 1 in which a hand-wheel 82 is shown which is attached to this shaft. Moreover, an inclined threaded spindle 84 is journalled in the member 75 and is geared to the shaft carrying the handwheel 82 by a pair of bevel-gears 83. A nut 88 engaging the threads of spindle 84 is attached to the guide 77. By turning the handwheel 82, the operator may thus shift the guide 77 on the slanting guide-way 76 to thereby lift or lower the work piece.

For shifting the work-support 79 on the transverse guideway 78 of the guide 77, a second hand-wheel 85 (Fig. 1) is attached on a suitable threaded spindle journalled in the guide 77. The threads of this spindle are engaged by a nut attached to the lower section 80 of the work support 79. This lower section 80 carries a vertical trunnion 86 on which the upper section 81 of the work-support is pivotally mounted by means of an anti-friction bearing 87. The two sections 80 and 81 of the work-support may be relatively shifted by rotation of an eccentric (not shown) which is journalled in the lower section 80 and engages suitable stops attached to the upper section 81. By angularly adjusting the upper section about the trunnion 86, the work piece may be set, as required, if the opposed internal faces to be finished are not parallel but are inclined to one another.

The work piece may consist of any desired material, particularly of steel.

It will appear from the fore-going description that the machine is simple in design and operation, but possesses all of the properties which will ensure great accuracy in operation. Thus, the beam carrying the grinding discs being composed of coaxial tubes combines a minimum of weight with a considerable stiffness. The composition of the beam of a plurality of separable sections facilitates the mounting of the work piece considerably, since one of the tubular beam sections may be readily released from the other section and may be then quickly withdrawn by operation of the hand-wheel 29 in order to remove the finished work piece and to insert a new one. As the driving motor is mounted on one of the standards coaxially of the beam, the means for transmitting the driving motion to the grinding discs may be in form of a shaft that can be accommodated within a tubular beam of a small diameter, and the grinding head may be made much smaller than it would be possible, if the motor were included in the head. The mounting of the driving motor on one of the standards offers the additional advantage that the beam will not be deflected by the weight of the motor. The possibility of angularly adjusting the grinding head 26 makes it possible to successively work on different pairs of opposed faces of the work piece without detaching the work piece from its holder. All that is necessary, after one pair of faces has been finished, is to transport the slide 74 on the guide-way 24 to the end position in which the work piece surrounds the tube 27' only and is out of engagement with the grinding discs. Then, the clamping screws connecting the tubular section 27 with the grinding head 26 are released and the other tubular section 27' with the grinding head is then turned through 90 degrees, as above described. Then, the beam sections are reattached whereupon the other pair of faces may be ground.

While I have described a preferred embodiment of my invention, it is to be understood that the same is not limited to the details of this embodiment but is capable of numerous modifications within the scope of the appended claims.

What I claim is:

1. A grinding machine comprising a frame, two spaced standards thereon, aligned bearings in said standards, a horizontal beam carried by and extending between said standards and constituted by separable sections, one of said sections being journalled in each of said bearings, a rotary spindle journalled in one of said sections and extending transversely thereto and carrying at least one grinding disc, means mounted on one of said standards and cooperating with said section for shifting the same lengthwise, a guide-way on said frame extending parallel to said beam, and a reciprocatory work table mounted on said guide-way.

2. A grinding machine comprising a frame, two spaced standards thereon, a horizontal beam carried by and extending between said standards and composed of a grinding head and of two coaxial tubes extending from the opposite ends thereof, a spindle journalled within said head in transverse position, at least one grinding disc fixed to said spindle, a guide-way on said frame extending parallel to said beam, and a reciprocatory work table slidably mounted on said guide-way.

3. A grinding machine comprising a frame, two spaced standards thereon, a horizontal beam carried by and extending between said standards and composed of a grinding head and of two coaxial tubes extending from the opposite ends thereof, a holder mounted in said head to be adjustable about a transverse axis, means for adjusting said holder about said axis, aligned bearings in said holder having a common axis extending transversely to said beam and to said first-mentioned axis, a spindle journalled in said bearings and carrying at least one grinding disc, a guide-way on said frame extending parallel to said beam, and a reciprocatory work table slidably mounted on said guide-way.

4. A grinding machine comprising a frame, two spaced standards thereon, aligned bearings in said standards, a horizontal beam composed of separable sections and mounted in said bearings, a grinding disc mounted on said beam having its axis extending at right angles thereto, means including an index disc and an index dog coordinated to one of said bearings and one of said sections for relative angular adjustment, clamping means for fixing said latter section in adjusted position in its bearing, means coordinated to the other one of said bearings for longitudinally shifting one of said sections mounted therein, clamping means for fixing said last-mentioned section within its bearing, a guide-way on said frame extending parallel to said beam, and a reciprocatory work table slidably mounted on said guide-way.

5. A grinding machine comprising a frame, two spaced standards thereon, a horizontal beam carried by and extending between said standards, a grinding disc mounted on said beam having its axis extending at right angles thereto, a guide-way on said frame extending parallel to said beam, a reciprocatory work table mounted on said guide-way, at least one of said standards being slidably and adjustably mounted on said guide-way, and means for clamping said last-mentioned standard on said guide-way in adjusted position.

6. A grinding device of the class described comprising a frame, a pair of standards on said frame, an independent beam part mounted by each standard and adjustable thereto, a housing carried by and between the beam parts predeterminedly positioned relatively to the work and a grinder mounted by the housing.

7. The structure of claim 6 in which at least one of the beam parts is adjustable to its mounting standard in a different relationship than the remainder of said beam parts.

8. A grinding machine comprising a frame, two spaced standards thereon, a horizontal sectional beam having a part thereof carried by each standard, means operable to adjust one part of the beam horizontally as to its supporting standard, an additional beam part mounted by the standard carried parts and locked in lateral position as to the frame by the adjustable beam part, a guide-way on said frame extending parallel to the beam, a grinding disc mounted on the additional beam part and having its axis extending at right angles thereto, and a reciprocatory work table mounted on said guide-way.

9. A grinding machine comprising a frame, two spaced standards thereon, a horizontal sectional beam having a part thereof carried by each standard, means operable to rotatably adjust one part of the beam as to its supporting standard independently of the other standard carried beam part, an additional beam part mounted between the two standard carried beam parts and rotatably movable with the adjustable beam part, a guide-way on said frame extending parallel to the beam, a grinding disc mounted on the additional beam part and having its axis adjustable to a radius of any angularity in a plane extending at right angles thereto, and a reciprocatory work table mounted on said guide-way.

10. A grinding machine comprising a frame, two spaced standards thereon, a horizontal multi-part beam having a part thereof carried by each standard, means operable to rotatably adjust one part as to its standard, means to horizontally adjust a second part as to its standard, an additional intermediate part mounted by and between said first two parts and locked into lateral position as to the frame by the horizontally adjustable part and angularly by the rotatably adjustable part, a guide-way on said frame extending parallel to the beam, a grinding disc mounted by the additional intermediate beam part and having its axis in a plane at right angles thereto, and a reciprocatory work table mounted on said guide-way.

11. A grinding machine comprising a frame, two spaced standards thereon, one adjustable toward and from the other, a horizontal sectional beam having a part thereof carried by each standard, means operable to adjust one part of the beam horizontally as to its supporting standard, means operable to adjust the other part as to its standard and additional intermediate part mounted by and between said two parts and locked into lateral position as to the frame by the horizontally adjustable part and angularly by the rotatably adjustable part, a guide-way on said frame extending parallel to the beam, a grinding disc mounted by the additional intermediate beam part and having its axis in a plane at right angles thereto, and a reciprocatory work table mounted on said guide-way.

12. A grinding machine comprising a frame, two spaced standards thereon, a horizontal sectional beam carried by and extending between said standards, said beam having a part carried by each standard and independently adjustable, one as to the other, an intermediate beam part mounted and positioned by the standard carried parts, a guide-way on said frame extending parallel to said beam, a grinding disc mounted on the intermediate beam part and having its axis extending at right angles thereto, a motor mounted on one of said standards, and a driving connection from said motor through the beam to the grinding disc.

13. A grinding machine comprising a frame, two spaced standards thereon, a horizontal tubular sectional beam carried by and extending between said standards, said beam having a part carried by each standard and independently adjustable as to their respective mounting standards, an intermediate tubular beam part mounted and positioned by two adjacent beam parts, said intermediate beam part having portions thereof in telescopic engagement with the two adjacent beam parts for holding said part in a fixed position, a guide-way on said frame extending parallel to said beam, a grinding disc mounted on the intermediate beam part and having its axis extending at right angles thereto, a motor mounted in the tubular beam, and a driving connection from said motor through the beam to the grinding disc.

MAX AHNERT.